No. 668,347. Patented Feb. 19, 1901.
A. L. CASE.
BED AND CYLINDER PRINTING PRESS.
(Application filed Feb. 26, 1900.)
(No Model.) 2 Sheets—Sheet 2.
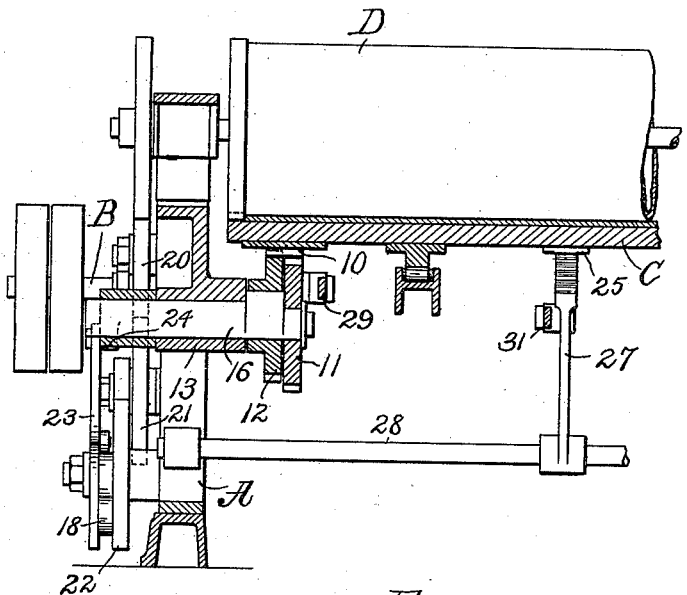
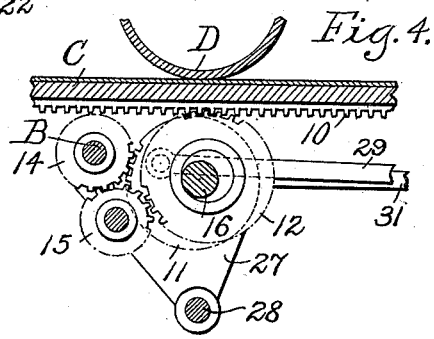
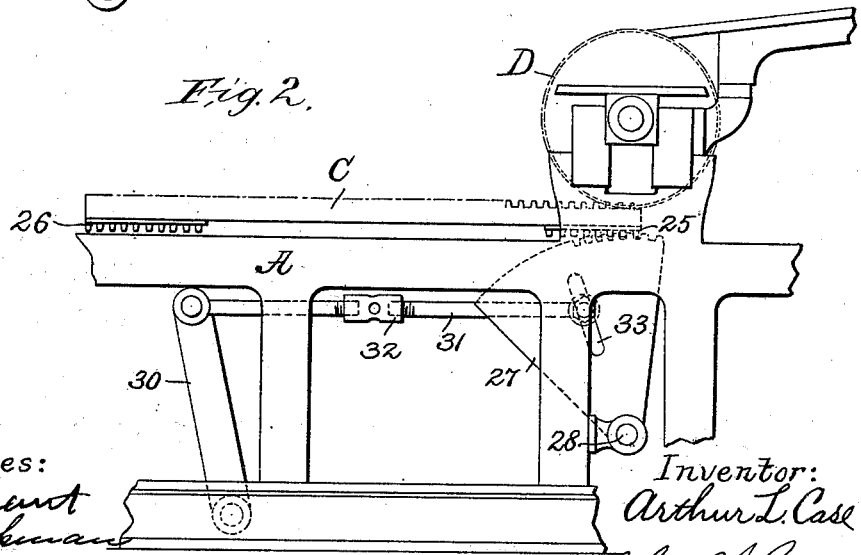
Witnesses:
W. C. Bryant
W. R. Chipman
Inventor:
Arthur L. Case
Geo. H. Graham
Atty.

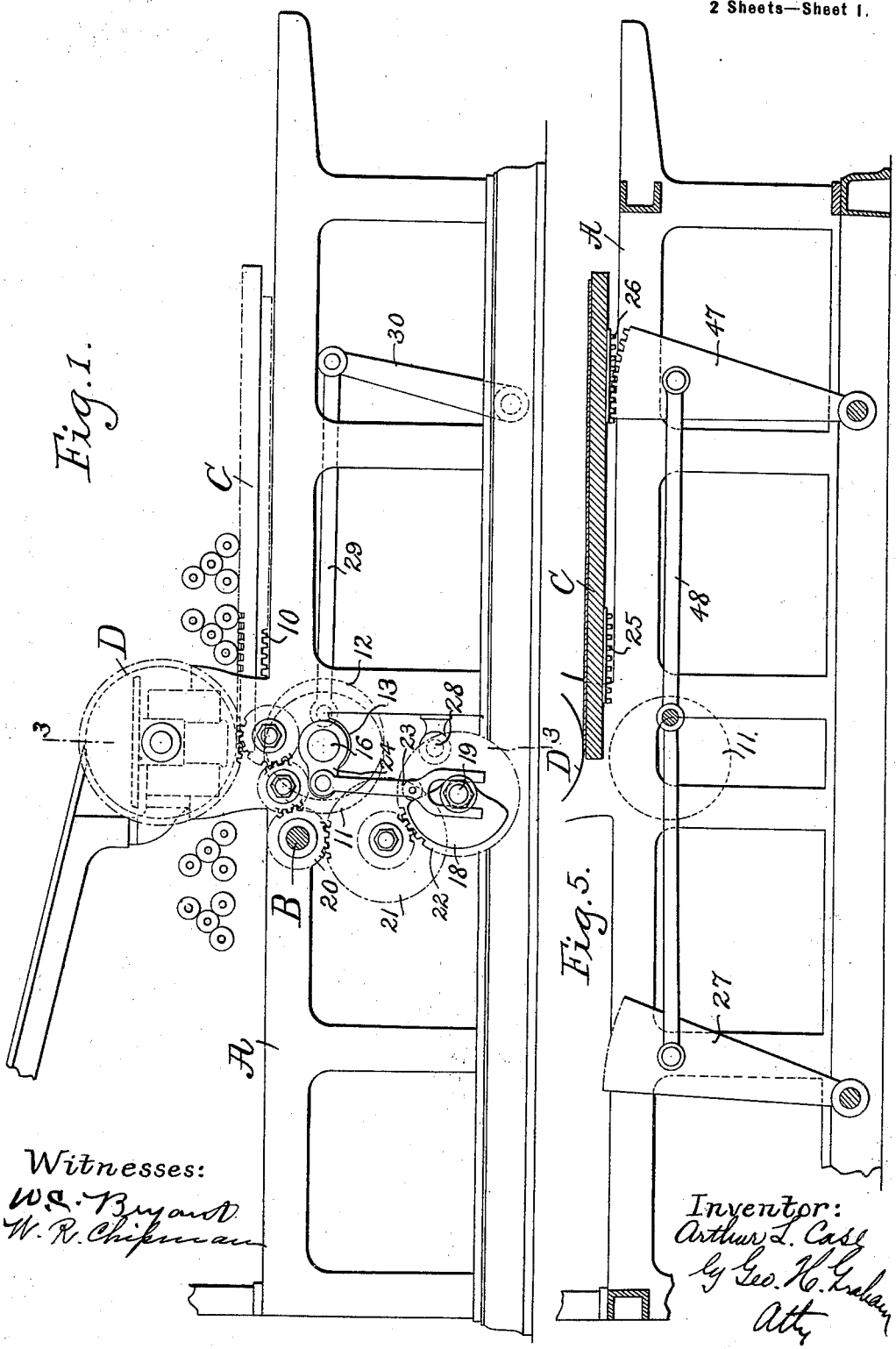

UNITED STATES PATENT OFFICE.

ARTHUR L. CASE, OF PLAINFIELD, NEW JERSEY.

BED-AND-CYLINDER PRINTING-PRESS.

SPECIFICATION forming part of Letters Patent No. 668,347, dated February 19, 1901.

Application filed February 26, 1900. Serial No. 6,442. (No model.)

*To all whom it may concern:*

Be it known that I, ARTHUR L. CASE, a citizen of the United States of America, and a resident of Plainfield, county of Union, and State of New Jersey, have invented certain new and useful Improvements in Bed-and-Cylinder Printing-Presses, of which the following is a specification.

The present invention relates generally to means for converting a rotary motion into reciprocatory motion, such being particularly adapted for use in bed-and-cylinder printing-machines.

The improvements include a rotating member or driver, a reciprocated member or form-bed, and connections between the driver and the form-bed consisting of gearing moving in opposite directions, the gears of which are alternately moved into operative or driving connection with the form-bed.

More particularly stated, the improvements consist of a reciprocating form-bed having a rack thereon, a pair of gears eccentrically mounted adapted for alternate engagement with said rack, a cam or other means for removing one gear from engagement with the rack and placing the other gear in position for engagement with the rack, and a rotated gear and connections for driving the pair of gears in opposite directions. Furthermore, the improvements include an oscillatory member of segment or segments adapted to engage with toothed racks on the form-bed, the segment engaging some of the toothed racks at the time or before the disengagement and engagement of the pair of gears with the form-bed rack, so that the motion of the form-bed is always under control and the proper alternate engagement of the pair of gears with said rack is insured. With these instrumentalities is combined a cylinder, as in cylinder-presses driven in the usual manner, connected with the form-bed during impression, and having the usual means for raising and lowering the cylinder with respect to the form-bed for a well-known purpose.

With this general understanding of the invention a detailed description thereof will now be given, reference being had to the accompanying drawings, forming a part hereof.

In said drawings, Figure 1 is an elevation of one side of the machine, and Fig. 2 is an elevation of the other side thereof. Fig. 3 is a cross-section on the line 3 3 of Fig. 1. Fig. 4 is a cross-section of the bearings of the pair of eccentrically-mounted gears. Fig. 5 is a modification of the invention, partly in section.

Referring to said drawings, the several parts are mounted in a suitable framework A, providing a bearing for a driving-shaft B, a reciprocating member or form-bed C, and an impression-cylinder D for coöperation with the form-bed, with the common accessories, as is usual in bed-and-cylinder printing-presses.

The form-bed C is provided on its under side with a driven rack 10, with which is arranged for alternate engagement a pair of gears 11 12, carried by a bearing 13. The gears of this pair are driven in opposite directions from the driving-shaft B through a double-width gear 14, fast to said shaft, one part of said gear engaging direct with the gear 11 and the other part, through an intermediate 15, with the gear 12. These two gears 11 and 12 are loosely mounted on the two eccentrically-formed inner end portions of a shaft 16, that is mounted to oscillate in the bearing 13 of the framework, which shaft is rocked or oscillated at the proper time to remove one gear from engagement with the form-bed rack and place the other gear into engagement with said rack by any suitable mechanism, such as a cam 18. The cam 18 is carried loosely upon a stud 19, projecting from the framework, and is rotated from a gear 20, fast to the driving-shaft, through an intermediate 21, engaging a gear 22, fast with the cam. The cam is engaged by a roll carried by a link 23, that is pivotally connected by its upper end to a lever or arm 24, projecting from and secured to the eccentric carrying or rock shaft 16. The shape of the cam and the position of the eccentric portions of the shaft 16 are such that the gears 11 12 will be alternately engaged and disengaged to and from the form-bed rack, so that said form-bed will be reciprocated its full distance in one direction when its rack is engaged by one of the pair of gears and in the opposite direction when engaged by the other of said pair.

In order to insure the proper engagement of the pair of gears with the form-bed rack, the form-bed is provided on its under side with a pair of short racks 25 26, arranged to be alternately engaged by an oscillatory segment 27, that is mounted on a stud 28, projecting on the inner side of the framework. The segment 27 may be rocked by any suitable connection with a moving part of the machine. Thus one of the pair of gears, such as the gear 11, is provided with a crank-wrist 29, that is connected to the upper end of a rock-lever 30, pivoted to the framework and having a pitman 31, connected to the segment 27. The proper throw of the segment and adjustment of the parts may be had by dividing the pitman, with its threaded adjacent ends engaged by a nut 32, and also by providing a radial slot 33 in the segment, in which one of the ends of the pitman is adjustably secured.

The operation of these parts is such that at or just prior to one of the pair of gears leaving the form-bed rack one of the short racks will become engaged with the segment 27 while such segment is moving in the same direction as the form-bed. The segment now being engaged with the form-bed will control its further motion, and upon its oscillatory motion being reversed will carry the form-bed back with it until the form-bed rack is engaged by the other of the pair of gears, when the segment will leave its short rack preparatory to engaging the other short rack as or just prior to the gear leaving the form-bed, and thus repeat the operation.

The particular association of the mechanism shown may obviously be varied, and while the short racks are shown as engaged by a single segment it is apparent that the same result may be accomplished by the use of a pair of segments coupled together and moving as one, one segment for each short rack. So, too, it is unimportant as to the location of the crank-wrist for moving the rock-lever 30, as it is obvious that the means for moving said rock-lever on the segment may be had from some other part than one of the pair of gears.

As usual in bed-and-cylinder printing-presses, the impression-cylinder D will be suitably driven from the driving or other shaft and may during the impression movement have toothed connection with the form-bed, and also during the return movement of the form-bed will be raised out of the plane of impression by any proper means—such as that shown in Letters Patent to Charles Potter, No. 619,788, dated February 21, 1899. The printing-press will also have all the necessary and usual accessories needed in such presses.

In the modification, Fig. 5, an obvious change in certain parts of the improvement is shown. Instead of using a single segment common to the two short racks on the form-bed there is shown two segments 27 and 47, connected together by a link 48 and operated as before, one of the segments engaging one of the short racks and the other segment the other short rack.

What is claimed is—

1. The combination of a pair of oppositely-rotating driving-gears carried by a single shaft, a reciprocated member moved by said gears, and means for alternately moving each of said gears into and out of engagement with the reciprocated member, as described.

2. The combination of a pair of eccentrically-mounted and oppositely-rotating driving-gears carried by a single shaft, a reciprocated member moved by said gears, and means for alternately moving each gear into and out of engagement with the reciprocated member, as described.

3. The combination with a reciprocated member and its actuating means, of a pair of oscillatory segments engaging with independent racks on the reciprocated member at and during the reversal of movement of said reciprocated member, as described.

4. The combination of a pair of eccentrically-mounted and oppositely-rotating driving-gears carried by a single shaft, a reciprocated member moved by said gears, means for alternately moving said gears into and out of engagement with the reciprocated member, an oscillatory segment or segments, and a rack carried by the reciprocated member and engaged by said segment or segments at and during the alternate movement of the driving-gears, as described.

5. In a bed-and-cylinder printing-press, the combination of a form-bed, means for reciprocating said bed having periods of disconnection with the bed, a pair of oscillatory segments, and racks on the bed engaged by the segments during said periods of disconnection, as described.

6. The combination of a form-bed, a rack thereon, a pair of eccentrically-mounted driving-gears therefor, a single shaft carrying said gears, and a driven cam and connections for rocking said shaft and alternately engaging and disengaging each gear with the rack, as described.

7. The combination of a form-bed, a rack thereon, a single rock-shaft having two eccentric bearings, driving-gears on said bearings, for alternative engagement with said rack, and a driven cam for rocking said shaft, as described.

8. The combination of a form-bed, a rack thereon, a single rock-shaft having two bearings eccentrically disposed one to the other, driving-gears on said bearings for alternative engagement with said rack, a driven cam for rocking said shaft, an oscillatory segment or segments and short racks on the bed engaged by the segment or segments during the reversal of movement of the bed, as described.

In witness whereof I have hereunto set my hand in the presence of two witnesses.

ARTHUR L. CASE.

Witnesses:
GEO. H. GRAHAM,
W. H. GRAHAM.